US011493418B2

(12) United States Patent
Kosuth et al.

(10) Patent No.: US 11,493,418 B2
(45) Date of Patent: Nov. 8, 2022

(54) RHEOMETER DOCKING STATION

(71) Applicant: ALPHA TECHNOLOGIES SERVICES LLC, Akron, OH (US)

(72) Inventors: Patrick Kosuth, Wadsworth, OH (US); Michael R. Stoller, Orrville, OH (US)

(73) Assignee: Alpha Technologies Services LLC, Akron, OH (US)

( * ) Notice: Subject to any disclaimer, the term of this patent is extended or adjusted under 35 U.S.C. 154(b) by 383 days.

(21) Appl. No.: 16/608,827

(22) PCT Filed: Apr. 27, 2018

(86) PCT No.: PCT/US2018/029936
§ 371 (c)(1),
(2) Date: Oct. 26, 2019

(87) PCT Pub. No.: WO2018/201036
PCT Pub. Date: Nov. 1, 2018

(65) Prior Publication Data
US 2020/0200660 A1 Jun. 25, 2020

Related U.S. Application Data

(60) Provisional application No. 62/492,079, filed on Apr. 28, 2017.

(51) Int. Cl.
*G01N 11/02* (2006.01)
*G01N 35/00* (2006.01)
(52) U.S. Cl.
CPC ............. *G01N 11/02* (2013.01); *G01N 35/00* (2013.01); *G01N 2035/00306* (2013.01); *G01N 2035/00326* (2013.01)

(58) Field of Classification Search
CPC ................. G01N 11/02; G01N 35/00; G01N 2035/00306; G01N 2035/00326
USPC ....................... 73/54.01–54.43, 431; 206/569
See application file for complete search history.

(56) References Cited

U.S. PATENT DOCUMENTS

| | | | |
|---|---|---|---|
| 6,072,695 A | 6/2000 | Steiger et al. | |
| 6,442,639 B1 | 8/2002 | McElhattan et al. | |
| 8,398,408 B1 | 3/2013 | Hansen et al. | |
| 2007/0016619 A1 | 7/2007 | Padmanabhan et al. | |
| 2011/0098087 A1 | 4/2011 | Tseng | |
| 2011/0134601 A1 | 6/2011 | Sa | |
| 2016/0009530 A1 | 1/2016 | Teruzzi | |
| 2016/0021930 A1* | 1/2016 | Minskoff | ............. A61M 11/041 131/329 |
| 2016/0091517 A1 | 3/2016 | Gorin et al. | |
| 2016/0256866 A1 | 9/2016 | Nichols et al. | |

FOREIGN PATENT DOCUMENTS

WO 2010013065 A2 2/2010
WO 2014121216 A1 8/2014

* cited by examiner

*Primary Examiner* — Robert R Raevis
(74) *Attorney, Agent, or Firm* — Snyder, Clark, Lesch & Chung, LLP

(57) ABSTRACT

A rheometer docking station and methods of use are provided. Certain of the systems and methods described herein are capable of docking a rheometer to a rheometer docking station. Certain of the systems and methods described herein are capable of locating a rheometer in one, two or three dimensions.

46 Claims, 10 Drawing Sheets

RHEOMETER DOCKING STATION

CROSS-REFERENCE TO RELATED APPLICATIONS

This application claims the benefit of U.S. Provisional Patent Application Ser. No. 62/492,079, filed Apr. 28, 2017, which is hereby incorporated by reference in its entirety.

BACKGROUND

1. Field

Aspects relate generally to a rheometer docking station and methods of use.

2. Discussion of Related Art

Rheometers are typically used to determine various properties of a viscoelastic material, such as rubber, vulcanizable rubbers, polymers, plastics, thermoplastics, or other material. These instruments may be commonly referred to as Moving Die Rheometers (MDR), Rubber Process Analyzers (RPA), Oscillating Disk Rheometers (ODR) and/or Mooney Viscometers. These instruments may apply a rotational shear force to a material sample and may measure the resulting torque on the sample. Information about the material may be derived from the measured torque on the sample. It should be appreciated that the term "rheometer" refers to any rheological instrument used to measure a process characteristic of a viscoelastic material, including, but not limited to, the devices listed above.

SUMMARY

According to one aspect, a rheometer docking station is provided. The rheometer docking station may comprise, in some embodiments, a base and a docking body associated with the base, the docking body configured to receive a rheometer in a docking arrangement. The rheometer docking station may also include a guide configured to guide the rheometer into an aligned position with the docking body, the guide including an entry having a funnel-shaped configuration to facilitate alignment of the rheometer with the docking body as the rheometer is received by the docking body. The rheometer docking station may also include a first locating component associated with the docking body, the first locating component being configured to mate with a second locating component of the rheometer to locate the rheometer in a docked position.

According to another aspect, a rheometer docking system is provided. The rheometer docking system may comprise, in some embodiments, a rheometer and a rheometer docking station comprising a base, a docking station body and a guide for guiding the rheometer into an aligned position with the rheometer docking station. The guide may include a funnel-shaped configuration to facilitate alignment of the rheometer with the docking body as the rheometer is received by the docking body. The rheometer docking system may include a first locating component associated with the rheometer docking station and a second locating component associated with the rheometer. The first locating component may be configured to mate with the second locating component to locate the rheometer in a docked position.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Conventionally, most rubber testing is done in a central laboratory that is separate from the production floor where the rubber is being manufactured. In some instances, the production floor and the laboratory are in different rooms or even in different buildings. In such situations, samples of the rubber being manufactured are transported from the production floor to the laboratory in order to test the rubber to determine whether the product being produced meets desired specifications. The samples may be transported from the production floor to the laboratory using, for example, a vacuum tube system, by a person on foot or driving a vehicle, etc. An operator may cut and prepare samples for transport to the laboratory as the rubber is being produced. In the laboratory, an operator may receive the samples and insert the samples into rheometers in the lab for testing.

The inventors have recognized the need for an arrangement that permits a rheometer to be positioned on a production floor. The inventors have appreciated that, in some situations, by eliminating the need to transport samples over long distances, having the rheometer on the production floor may save time and resources. The inventors have also appreciated that the rubber production operation may benefit from faster testing feedback.

The inventors have also recognized the need for an arrangement that allows testing of samples in a rheometer without requiring the presence of an operator to place the sample in the rheometer. The inventors have appreciated that, in order to permit an operator-free arrangement, it may be beneficial to provide an arrangement to precisely locate the rheometer in a predetermined position and orientation so that a robotic machine can automatically place a sample in the rheometer at the correct position or otherwise interact with the rheometer.

Figure 1:
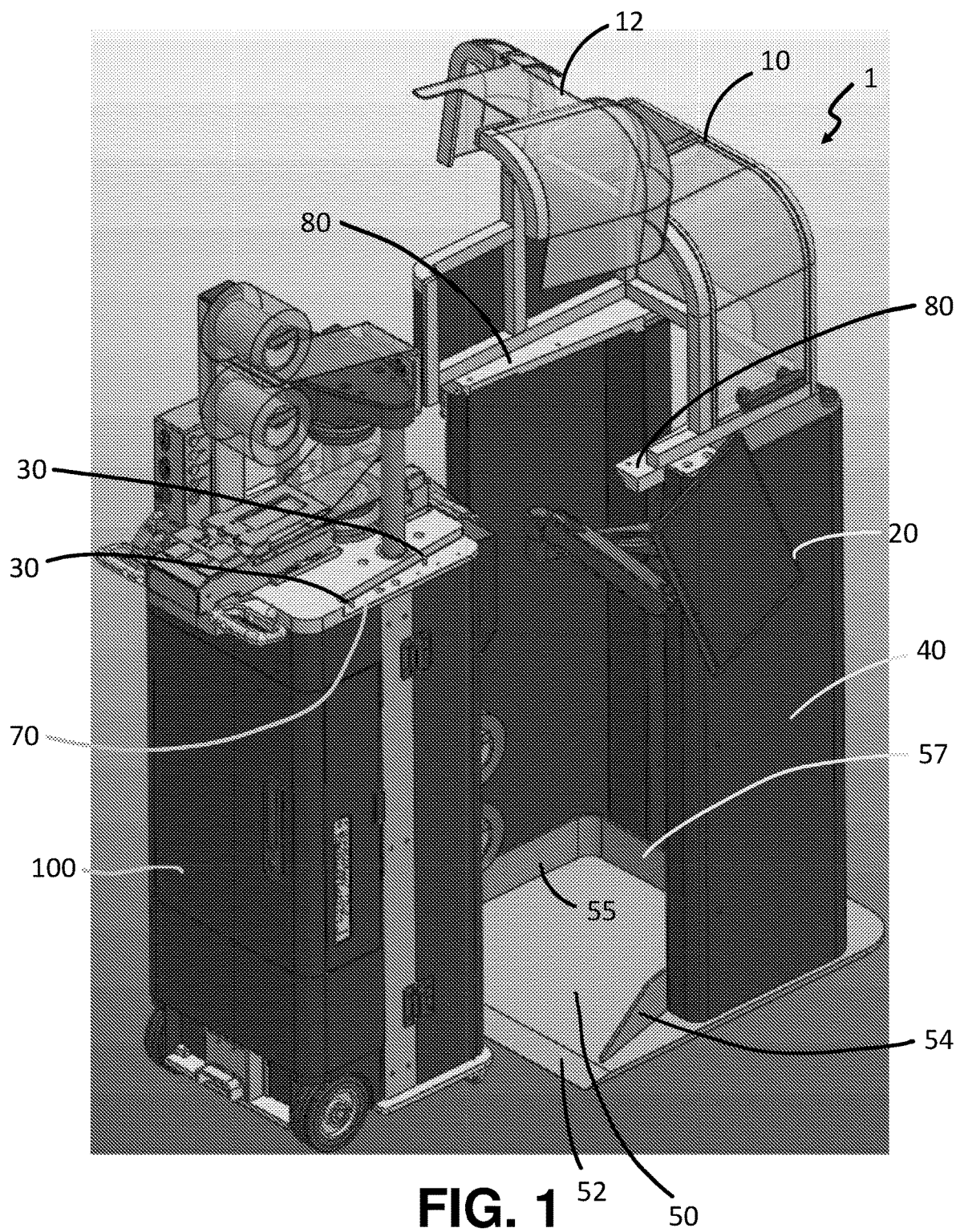
FIG. 1 depicts a perspective view of one embodiment of a rheometer docking station and a rheometer according to some aspects.

According to one aspect, a rheometer docking system locates the precise position and orientation of a rheometer. In one set of embodiments, systems and methods related to docking a rheometer with a rheometer docking station are described. FIG. 1 depicts a schematic illustration of a rheometer docking station 1 according to one set of embodiments, which can be used to receive a rheometer.

The rheometer docking station 1 may be configured to receive a rheometer 100. In some embodiments, the rheometer docking station 1 may include a base 50 and a docking body 40 connected to the base 50. In some embodiments, the docking body 40 may include sides that define a docking region that is shaped to receive the rheometer 100. In some embodiments, the docking body may include three sides. A space between two opposing sides may define an open side and serve as an entry for the rheometer to enter the docking region of the docking body. In some embodiments, an open side may allow the rheometer to be easily inserted and removed from the docking region of the docking station. In some embodiments, the body may include a door to cover and expose this open side.

In some embodiments, the base 50 may include a ramp 52 that facilitates rolling entry of the rheometer onto the base.

In some embodiments, the docking station may include a guide that helps to align the rheometer to the docking station when the rheometer initially enters the entry into the docking station. In some embodiments, the guide may be configured to guide the rheometer as the rheometer enters the docking station.

One illustrative embodiment of a guide 54 is shown in FIG. 1. In some embodiments, the guide may comprise one or more walls 55 with a surface that may face the rheometer as the rheometer enters the docking station. The guide may be located near or at the base 50 of the docking station. In other embodiments, the guide may have a greater height than that shown in FIG. 1 or may be located higher up and spaced from the base. In some embodiments, the docking station may have no base at all, in which case the guide may be attached to the docking body of the docking station rather than to the base.

In some embodiments, the guide may have a width defined as the distance between inner surfaces of the lateral walls of the guide. As shown in FIG. 1, the width of the guide may be sized to flank the opposite sides of the rheometer body when the rheometer enters the docking station. As the rheometer is moved into the docking station, the rheometer body may make contact with the guide. Contact with the guide may constrain lateral movement of the rheometer within a certain range of positions, which may help to center the rheometer in a properly aligned position relative to the docking station.

In some embodiments, the entry portion of the guide may have a funnel-shaped configuration with a width which gradually narrows to a smaller width in a direction pointing further into the docking region. The funnel-shaped configuration may help to facilitate entry of the rheometer into the docking station opening without requiring perfect alignment of the rheometer to one precise position. The initial larger width may allow the rheometer to enter the docking station opening as long as the rheometer is located within a range of possible positions. The gradual narrowing of the entry section of the guide may then serve to properly center the rheometer as the rheometer is moved further into the docking station.

In some embodiments, the guide 54 may have a back surface 57. In some embodiments, the rheometer may be moved into the docking station until the rheometer contacts and bottoms out against the back surface 57.

In some embodiments, the rheometer may have one or more locating features and the docking station may have corresponding one or more locating features that are sized and shaped to mate with the one or more locating features on the rheometer. Engagement between the one or more locating features on the rheometer with the one or more locating features on the docking station may serve to dock the rheometer with the docking station and/or may serve to locate the rheometer in one, two, or three dimensions. In some embodiments, the locating features include male components and corresponding female components that are configured to receive the male components. In one embodiment, the locating features include locating pins and corresponding guide openings, where the locating pins are sized and shaped to be received within the guide openings. In some embodiments, the guide openings may have be tapered to facilitate entry of the locating pins into the guide openings. In some embodiments, the guide openings may be circular, oval, square, rectangular, pentagonal, or any other suitable shape. In some embodiments, the locating pins may be shaped to correspond to the shape of the guide openings.

In the embodiment of FIG. 1, the locating pins 30 are positioned on the rheometer and the guide openings are positioned on the rheometer docking station. However, it should be appreciated that, in some embodiments, these components may be reversed, i.e., such that the locating pins are positioned on the rheometer docking station and the guide openings are positioned on the rheometer.

In some embodiments, the locating pins 30 may be held within and/or mounted to a pin base 70. In some embodiments, the guide openings may be located within a guide plate 80. In some embodiments, there may be two sets of locating pins, e.g., on the left side and on the right side of the rheometer (or, in embodiments where the pins are on the docking station, the left and right sides of the docking station). The guide openings may be correspondingly located on left and right sides of the docking station to align with the locating pins. In embodiments where the pins are on the docking station, the guide openings may be correspondingly located on left and right sides of the rheometer. In the embodiment of FIG. 1, the rheometer includes two sets of locating pins 30—one set is visible in the perspective view of FIG. 1, and the other set is positioned on the laterally opposing side of the rheometer. As also shown in FIG. 1, the docking station 1 includes two guide plates 80 on laterally opposing sides of the docking station, where each guide plate 80 includes one or more guide holes that correspond to the locating pins 30 of the rheometer.

In some embodiments, the guide described above, e.g., the guide 54 in FIG. 1, may be used to supplement the mating features. In some embodiments, the guide may help to initially position the rheometer with the docking station such that the mating features align when the rheometer is moved into the docking station.

Methods of docking a rheometer to a rheometer docking station according to some embodiments are now described. In some embodiments, the rheometer is first moved to the entry of the docking station and aligned with the opening of the open side. The rheometer may then be moved into the opening of the docking station. In some embodiments, the rheometer may be mounted on wheels to facilitate movement of the rheometer. During entry, the rheometer may first contact the guide 54. The gradual narrowing of the width of funnel-shaped entry may then serve to center the rheometer as the rheometer is moved further into the docking station.

In some embodiments, as the rheometer is moved as far as possible into the docking station, the rheometer may eventually abut against the back surface 57 of the guide 54.

In some embodiments, the guide may serve to locate the rheometer along one dimension. In other words, with the rheometer fully received within the guide, the guide may constrain movement of the rheometer along one dimension. For example, in the embodiment shown in FIG. 1, the guide 54 may prevent side to side lateral movement of the rheometer relative to the docking station.

Next, after the rheometer has been moved into the docking station, in some embodiments, at least the top portion of the rheometer may be lifted vertically. This may be accomplished in various ways. In some embodiments, the rheometer itself has a mechanism to lift at least the top portion of the rheometer. For example, in some embodiments, the rheometer may include feet underneath the instrument that lift the instrument upward. In some embodiments, an extender mechanism may be present at any location along the rheometer, such as at a mid-section, bottom portion, or top portion of the rheometer. In other embodiments, the docking station may serve to lift the rheometer. For example, the docking station may include a platform that can be raised or lowered, and the rheometer rests upon the platform. The moveable platform may be the base itself or may be supported by the base.

As discussed above, in some embodiments, the rheometer may include one or more locating pins, and the docking station may include one or more guide holes that may be sized and shaped to receive the locating pins. In some embodiments, the guide holes of the docking station are positioned within guide plates of the docking station. In embodiments where at least the top portion of the rheometer is lifted vertically, the locating pins of the rheometer may be raised into the guide holes of the docking station. In some embodiments, receipt of the locating pins into the guide holes may serve to locate the rheometer in two dimensions. In other words, with the locating pins aligned with and received within the guide holes, the position and orientation of the rheometer in two dimensions (e.g., left-right and forward-backward) may be known.

In some embodiments, as the at least top portion of the rheometer is raised, a surface of the rheometer may eventually top out against a bottom of the guide plate(s) of the docking station. The guide plate(s) may constrain vertical movement of the rheometer. As a result, with the locating pins received within the guide holes and the rheometer topped out against the guide plate(s), the rheometer may be located in three dimensions, e.g., left-right, forward-backward, and up-down. As a result, the precise position and orientation of the rheometer in three dimensions may be known. With the locating pins received within the guide holes and the rheometer topped out against the guide plates, the rheometer may be said to be docked with the docking station.

Figure 2:
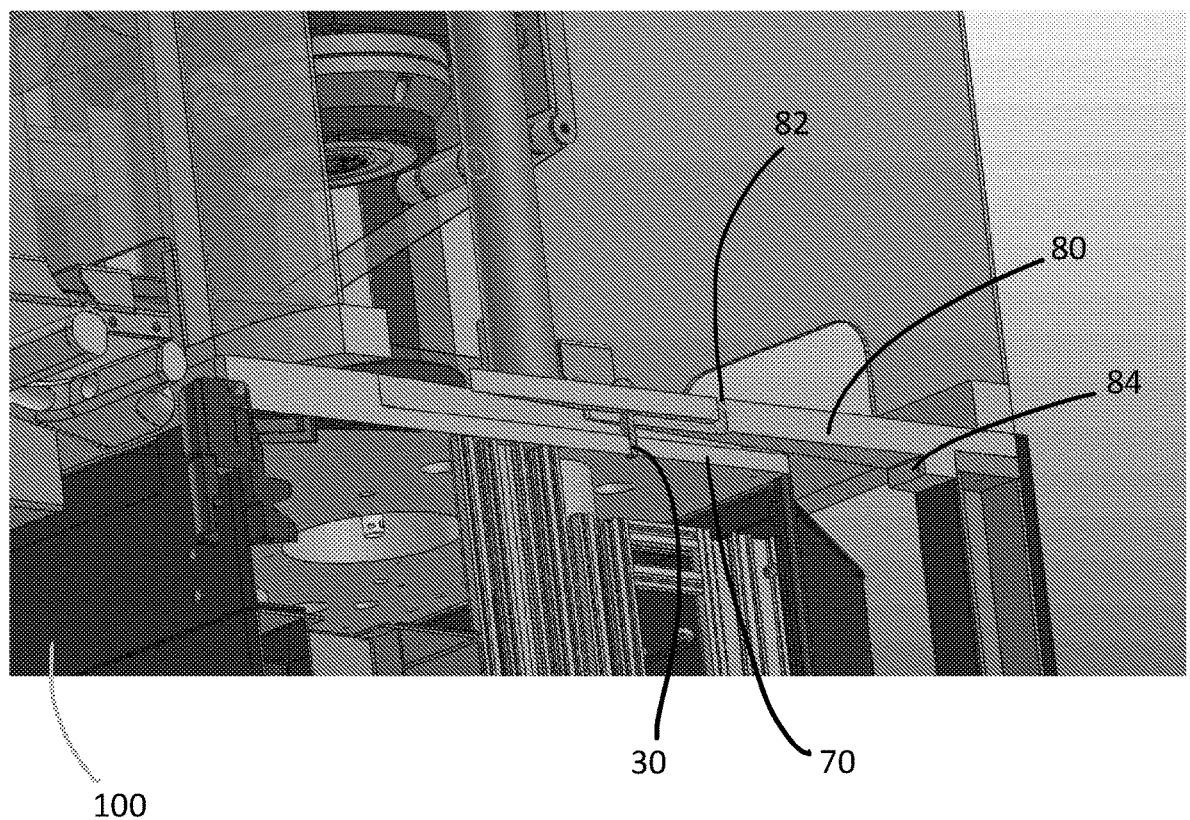
FIG. 2 depicts an enlarged view of a locating pin interacting with a guide plate and guide opening.

One illustrative embodiment of a locating pin moving toward a docked position into a corresponding guide hole is shown in FIG. 2. FIG. 2 depicts an enlarged view of a locating pin 30 of a rheometer 100 interacting with a guide opening 82 on a guide plate 80 of a docking station. The locating pin 30 of the rheometer may be held within a pin base 70 of the rheometer. As indicated by the arrow, as the rheometer is moved inward into the docking station toward a docked position, the pin also travels inwardly. In some embodiments, a leading end of the pin base 70 may abut against a ledge 84 of the guide plate 80. Alternatively or in addition, as discussed above, the rheometer may abut against the guide 54 (shown in FIG. 1). In some embodiments, an at least top portion of the rheometer 100 may then be raised vertically, causing the pin 30 to enter the guide opening 82.

As discussed above, in some embodiments, the mating features may be reversed, e.g., locating pins are positioned on the docking station and guide holes are located on the rheometer. In such embodiments, if the at least top portion of the rheometer is raised during docking of the rheometer to the docking station, the guide holes are raised to receive the locating pins.

In some embodiments, the rheometer may dock with the docking station without needing to raise the at least top portion of the rheometer. In some embodiments, as the rheometer is moved into the docking station toward a docked position, the locating pins on the rheometer may make contact with a guide plate on the docking station. In some embodiments, the locating pins may be spring loaded or otherwise moveable and biased toward a vertically upward direction. Contact between the locating pins and the guide plate may cause the locating pins to be pushed vertically downwardly. As the rheometer is moved further into the docking station toward the docked position, the locating pins may remain in a pushed-down position due to continued contact with the guide plate until the rheometer is moved far enough into the docking station such that the locating pins are aligned with the guide holes of the docking station. With the locating pins and the guide holes aligned, the locating pins, which may be biased to move back to the vertically upward position, may move upward into the guide holes. In embodiments where the locating pins are on the docking station and the guide holes are on the rheometer, the locating pins on the docking station may also be similarly spring biased or otherwise arranged to be moveable vertically but biased to return to a downward position in order to enter the guide holes of the rheometer.

In yet another embodiment, the locating pin may travel along a track in the corresponding guide plate as the rheometer is moved into the docking station toward the docked position. In some embodiments, the locating pin may abut against an end surface of the track. The track may include a spring biased or other biased door or mechanism that holds the locating pin in place once the pin has bottomed out against the end surface the guide plate track.

Figure 3:
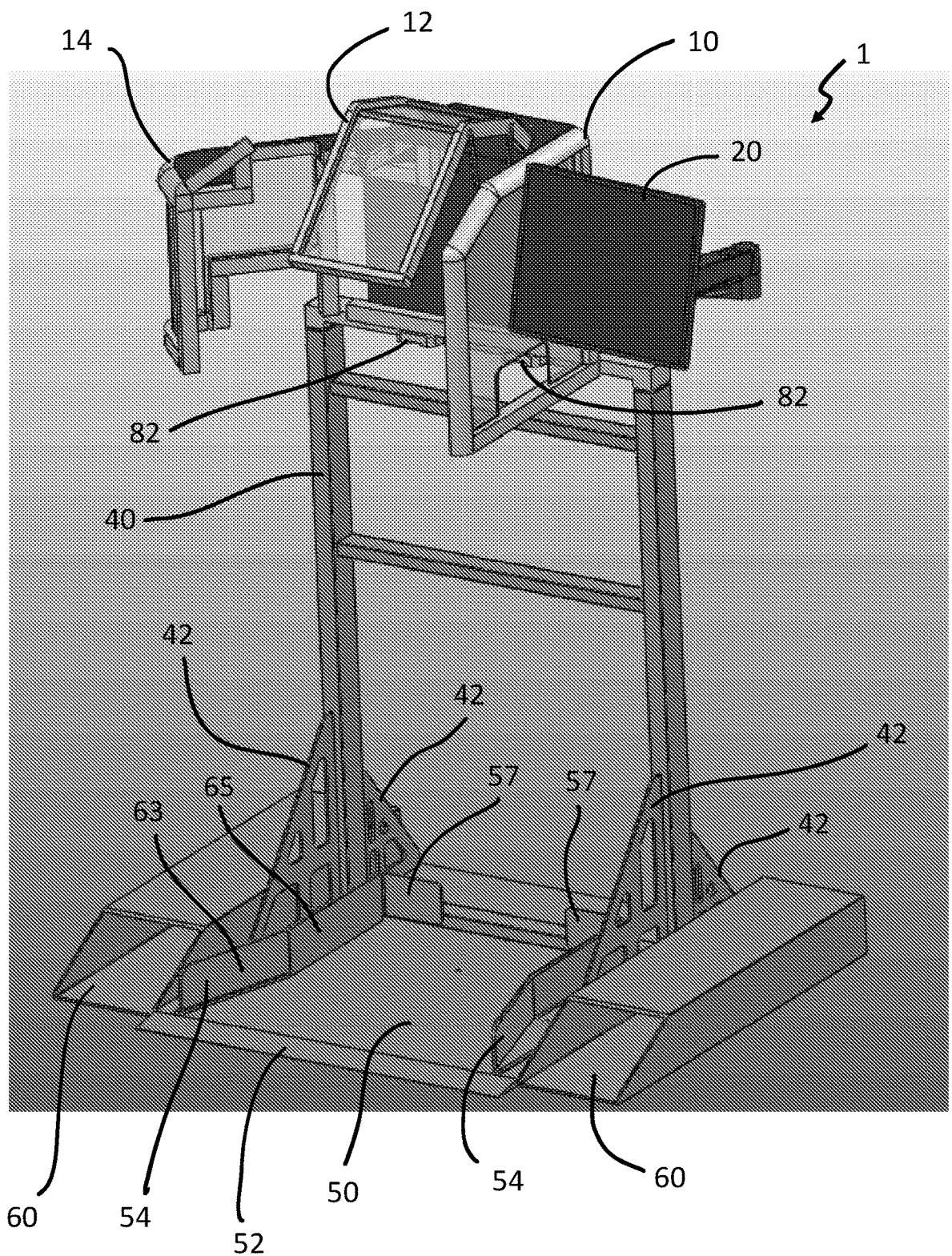
FIG. 3 depicts a perspective view of one embodiment of a rheometer docking station according to some aspects.
Figure 4:
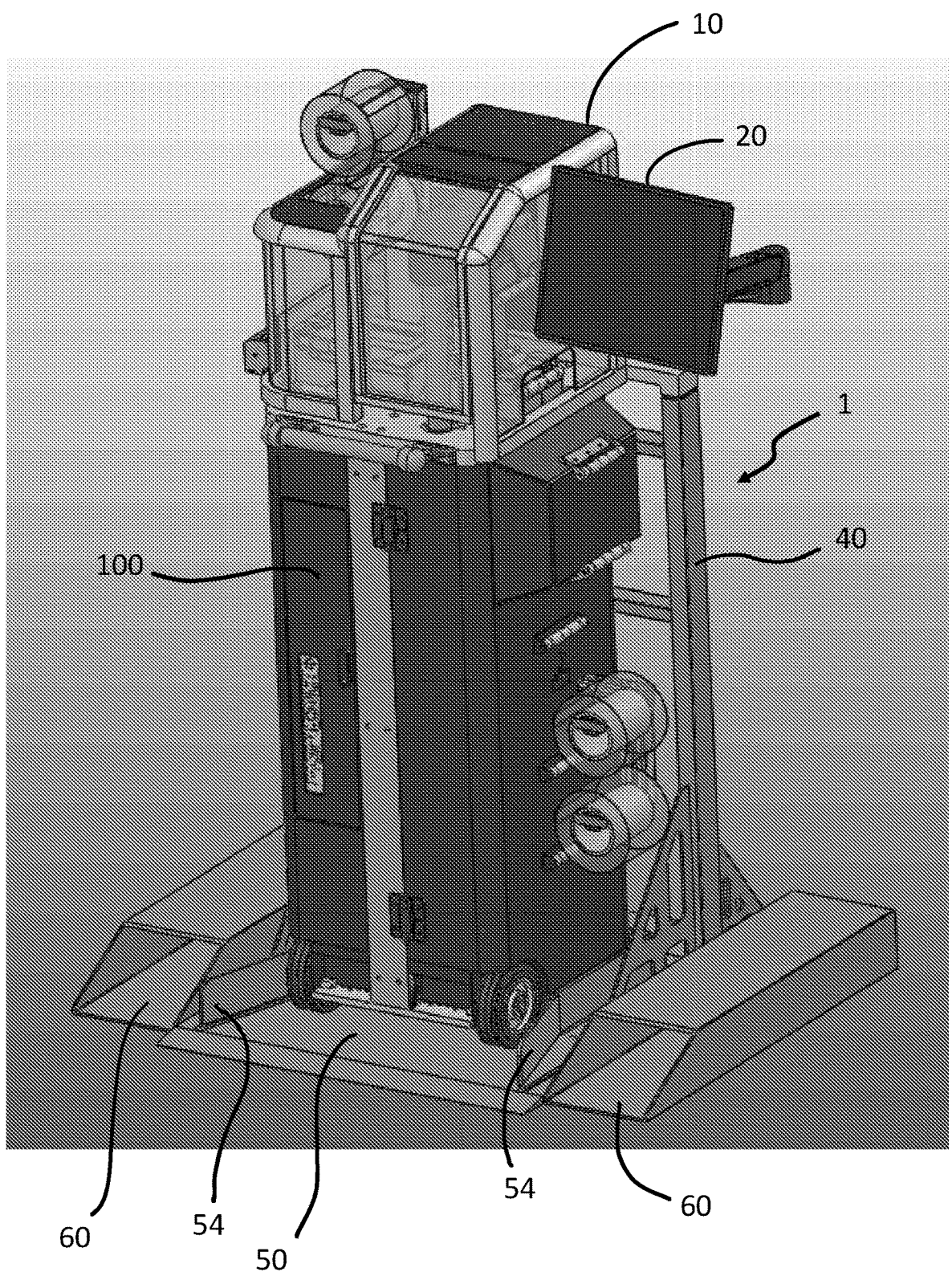
FIG. 4 depicts the rheometer docking station of FIG. 3 with a docked rheometer.

Another illustrative embodiment of a docking station is shown in FIGS. 3-4. As shown in FIG. 3, in this embodiment, the docking station has openings 82 for receiving locating pins of a rheometer. The openings 82 may be in the shape of tapered slots. The rheometer may include locating pins at a leading face of the rheometer that face toward the openings 82 as the rheometer is moved into the docking station. As the rheometer is moved into the docking station toward a docked position, the pins on the rheometer may align with the slots 82 and the pins may enter the slots 82. The pins on the rheometer may eventually bottom out inside the tapered slots 82 of the docking station.

The guide 54 of the docking station 1 may help to facilitate alignment of the locating pins with the openings. The guide 54 may have a funnel-shaped section 63 of gradually decreasing width to facilitate alignment of the rheometer with the docking station as discussed above. The guide may also have a straight section 65 of uniform width further inside the docking region.

In some embodiments, the docking body 40 of the docking station may be a frame 40. In some embodiments, the frame 40 may be supported by one or more supports 42.

According to some aspects, the rheometer docking station may include features to enhance portability of the docking station. In some embodiments, the docking station may be configured to be transported by a vehicle such as a forklift. The docking station may include lift tubes that are configured to receive a fork of a forklift. In some embodiments, the docking station may be configured such that the docking station and rheometer may be transported together while the rheometer is docked with the docking station. One illustrative example of a docking station having lift tubes 60 is shown in FIG. 3.

In some embodiments, the rheometer docking station may include a hood that may be used to enclose a portion of the rheometer, such as the moving portions of the rheometer. In some embodiments, the hood may have one or more movable doors that can be raised/lowered and/or pivoted laterally to permit receipt and removal of at least a portion of the rheometer. In some embodiments, the hood may be transparent or translucent to permit visibility of at least a portion of the rheometer.

In the embodiment shown in FIG. 3, the docking station 1 includes a hood 10 having a first moveable door 12 and a second moveable door 14. Door 12 may pivot up and down relative to the docking body, and door 14 may pivot side to side relative to the docking body. Prior to receiving a rheometer, the doors 12, 14 may be moved to an open position to receive the rheometer. The doors may be moved by an automated assembly and/or may be manually opened and closed.

According to one aspect, in some embodiments, a rheometer docking station may receive more than one rheometer at a time. In one illustrative embodiment shown in FIGS. 5-6, a docking station 1 may include two rheometer stations: one to receive a first rheometer 101 at base 50 and another to receive a second rheometer 102 at base 51. Each rheometer station may have any combination of the features described above. For example, each rheometer station may have guides 54, 58 to facilitate initial alignment of the rheometer with the docking station. Each rheometer station may have openings 82 for receiving corresponding locating pins of the rheometer.

According to one aspect, a rheometer docking station may include robotic machines that may be configured to place and remove samples in a rheometer without a human operator. As one illustrative example, the robotic machine may include surface mount technology (SMT) component placement systems, also called pick-and-place machines or P&Ps, which may use gantries, jointed arms, and/or any other suitable component for movement.

Figure 5:
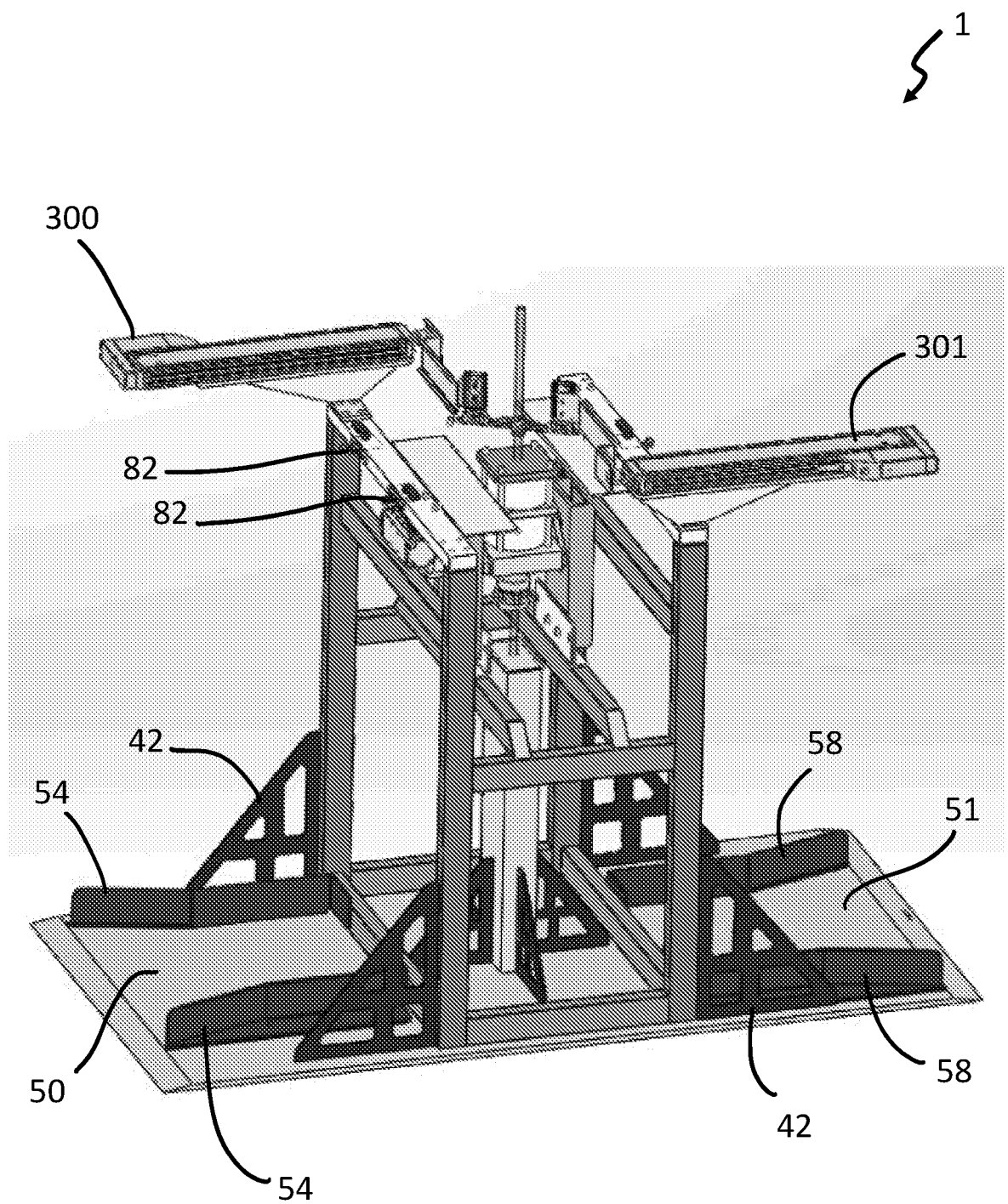
FIG. 5 depicts a perspective view of one embodiment of a rheometer docking station according to some aspects.
Figure 6:
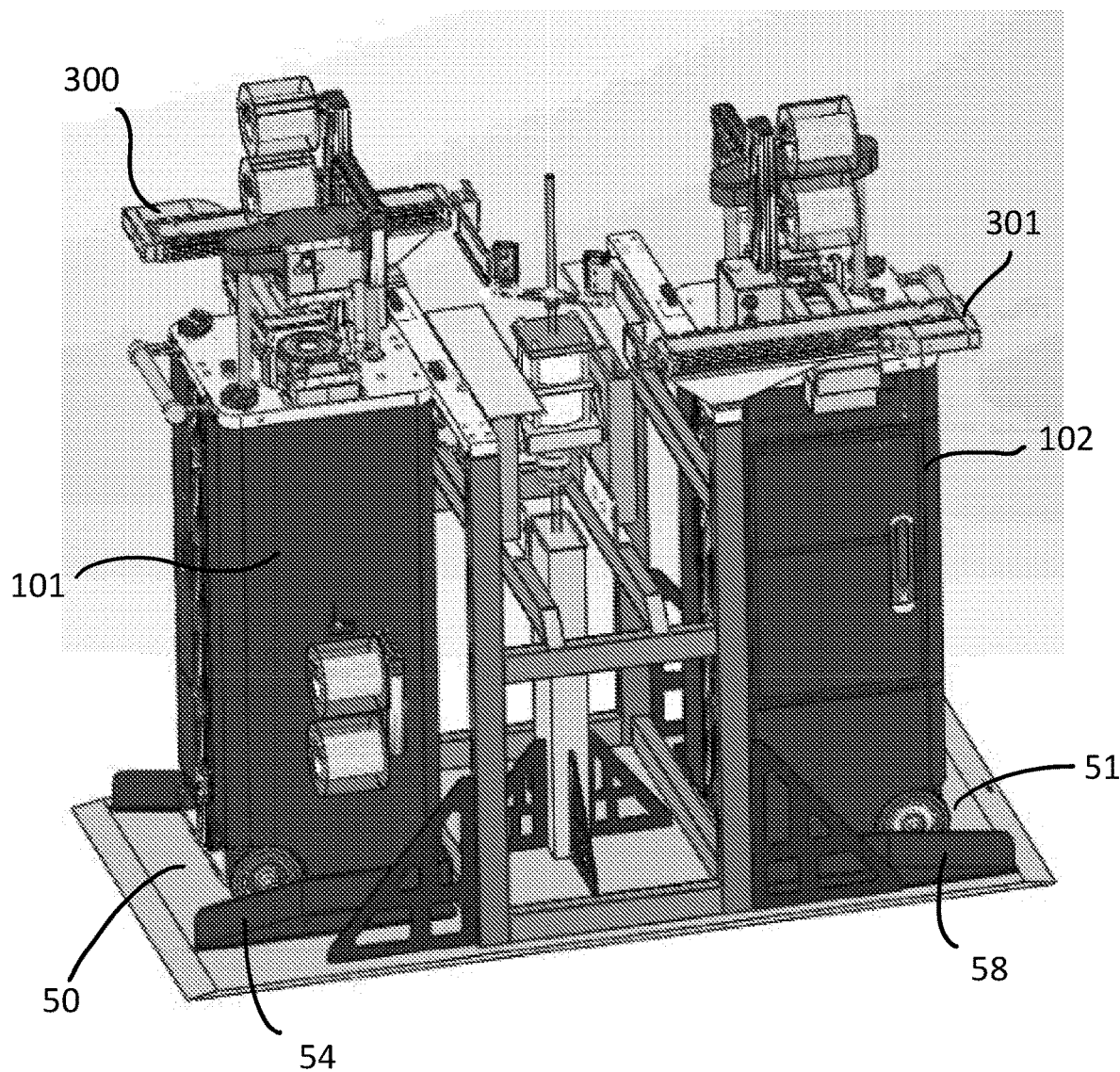
FIG. 6 depicts the rheometer docking station of FIG. 5 with two docked rheometers.

The illustrative embodiment shown in FIGS. 5-6 include robotic machines 300, 301, with each robotic machine operating with its own rheometer. The robotic machine may be used to pick up sample from a production machine, place the sample at a proper location on the rheometer for testing, and then remove the sample from the rheometer after testing is complete.

Figure 7:
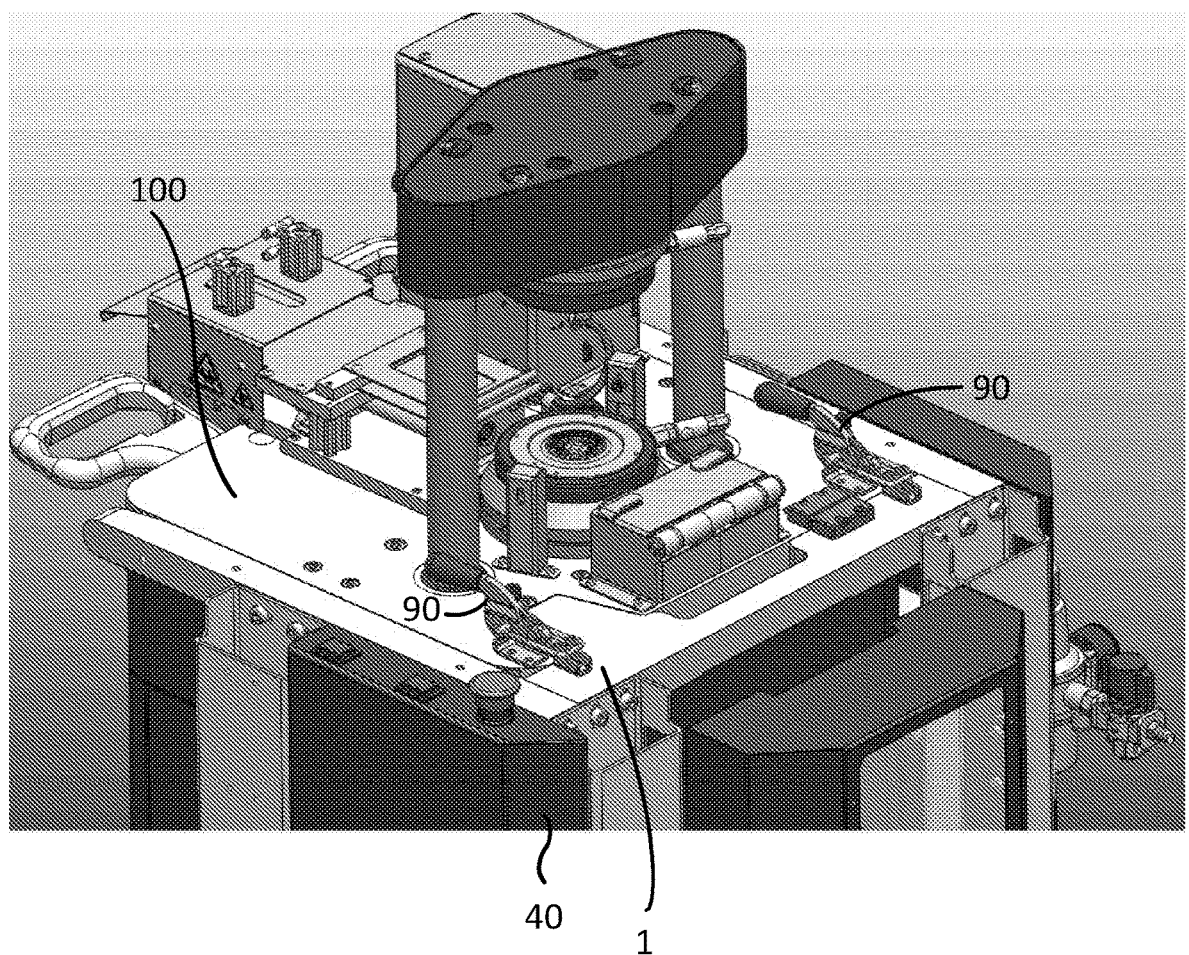
FIG. 7 depicts a perspective view of another embodiment of a rheometer docking station and a rheometer having a locking mechanism.
Figure 8:
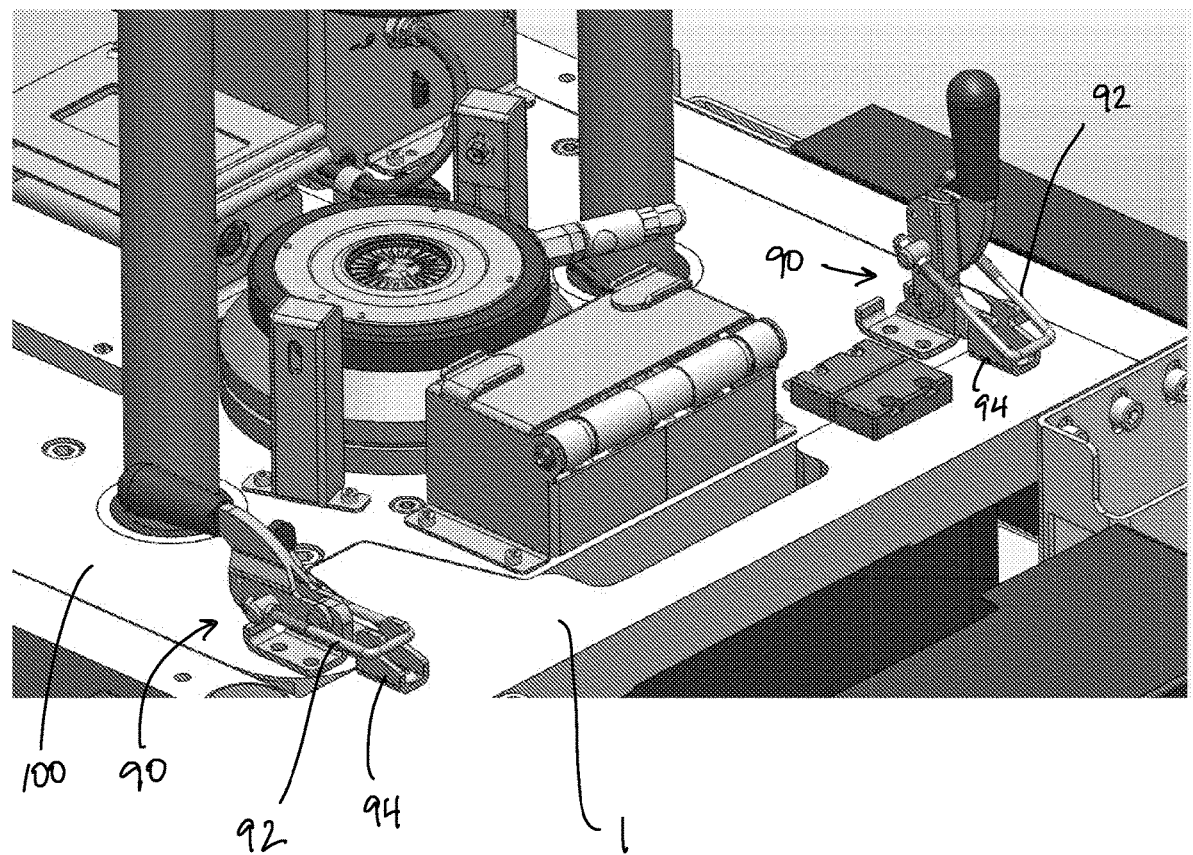
FIG. 8 depicts an enlarged view of the locking mechanism shown in FIG. 7.

In some embodiments, after the rheometer is moved into final docking position relative to the docking station, the rheometer may engage with the docking station via a locking mechanism. The locking mechanism may prevent unwanted separation between the rheometer and docking station. In some embodiments, the locking mechanism is a latching arrangement that locks the rheometer to the docking station. In some embodiments, the rheometer side of the locking mechanism may be mounted to a top plate of the rheometer. In some embodiments, the docking station side of the locking mechanism may be mounted to the top of the docking station. In one illustrative embodiment shown in FIGS. 7-8, a locking mechanism 90 may be used to keep the rheometer 100 engaged with the docking station 1 after the rheometer has been received within the docking body 40 of the docking station. As shown in more detail in FIG. 8, in some embodiments, the locking mechanism may comprise latch-action toggle clamp which may include a latch 92 and a hook 94, where the latch engages with the hook to lock the rheometer 100 to the docking station 1. In the embodiment shown in FIGS. 7 and 8, the latch 92 is on the rheometer and the hook 94 is on the docking station, but the components may be reversed such that the latch is on the docking station and the hook is on the rheometer. Other locking mechanisms are also possible, such as other types of toggle clamps, a spring-loaded clamp, a wedge-type clamping mechanism, a vise-type clamp, a friction clamp, a magnetic clamp, or any other suitable locking mechanism.

It should be understood that other embodiments of a rheometer and docking station are possible. In one embodiment, the rheometer is not lifted vertically once moved into the docking station. Instead, the rheometer may be moved into the docking station in a similar manner as described above, but without the lifting step.

In some embodiments, the rheometer is pushed into the docking station using locating pins as a guide. Once pushed against the docking station, the rheometer may engage with the docking station via, e.g., a locking mechanism that engages the rheometer to the docking station.

In some embodiments, locating pins may cooperate with a slot to help guide the rheometer into the correct docking position within the docking station. In some embodiments, the locating pins may be horizontal. In some embodiments, the locating pins may be positioned on the docking station and the slot may be positioned on the rheometer, or the components may be swapped.

Figure 9:
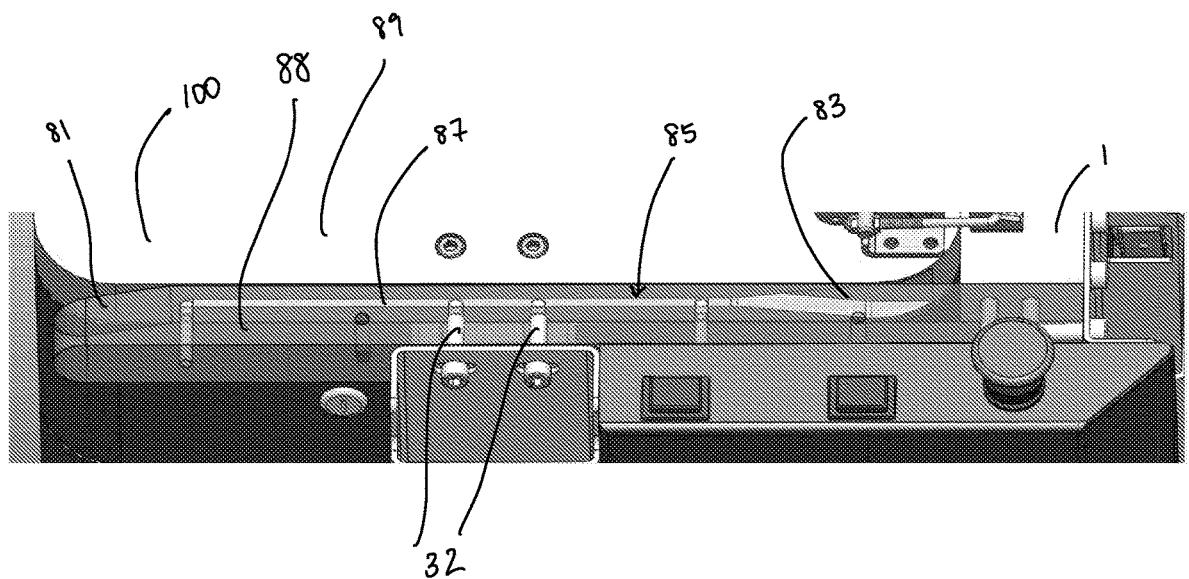
FIG. 9 depicts an enlarged view of a locating pin interacting with a guide plate and guide opening.

One illustrative embodiment is shown in FIG. 9. The rheometer 100 may include a guide plate 89 having a guide opening in the form of a slot 85. Locating pins 32 may cooperate with the slot 85 to guide the rheometer 100 to dock with the docking station 1. In the embodiment shown in FIG. 9, the locating pins 32 are connected to the docking station 1, and the slot 85 is part of the rheometer 100, but it other embodiments, the components may be reversed in location such that the locating pins are connected to the rheometer and the slot is part of the docking station. It should also be appreciated that, in some embodiments, the locating pins and slot arrangement may be mirrored on the other side of the rheometer and docking station. In some embodiments, the slot 85 may start off with a widened tapered region 83 before gradually transitioning into a narrowed region 87. As such, the slot may vary in width, starting with a wider width that tapers into a narrower width. The slot may have an extended region having a constant width after the tapered region. When docking the rheometer to the docking station, the locating pins 32 may first enter the slot 85 via the tapered region 83. The tapered region 83 may help with initial entry of the rheometer into the docking station and help to gradually center the rheometer into the proper docking position as the locating pins 32 enter the narrowed region 87 of the slot. In some embodiments, the locating pins 32 may pass through a guide plate 88 of the docking station and point inwardly toward the docking station opening that receives the rheometer. In some embodiments, the guide plate may begin with an angled initial funnel section 81 that may form a tapered opening that facilitates entry of the rheometer into the docking station.

In some embodiments, the rheometer 100 is pushed into the docking station 1 using the locating pins 32 as a guide. As the rheometer is pushed into the docking station, the locating pins 32 enter the tapered region 83 of the slot, and gradually help to center the rheometer as the locating pins 32 enter the narrowed region 87 of the slot. After the rheometer is pushed against the docking station, the rheometer 100 is locked with the docking station 1 by engaging the locking mechanisms 90 (FIGS. 7 and 8) into the locked orientation.

In some embodiments, a position mapping process may be used to map the position of the robotic machine relative to the components of interest in the room (e.g. a production floor or a laboratory). Components of interest may include the docking station and the rubber production machinery. Any suitable process for position mapping of components may be used. For example, in some embodiments, a position mapping process may use cameras or other vision devices to map components of interest. In some embodiments, the positions of components of interest may be physically indexed, e.g., by hand, and a software program may be used to "remember" the position of the component. Such positions may be stored into non-volatile memory of a computer.

According to one aspect, in some embodiments, one potential benefit of using a rheometer docking station is that the rheometer itself need not be mapped. This may allow rapid exchanges of rheometers (e.g., for maintenance or to use rheometers of different types) without requiring re-mapping or calibration of the system between exchanges.

According to one aspect, the rheometer docking station may provide power, data, pressurized air, or other suitable connection to the rheometer. In some embodiments, the power, data, pressurized air, etc. may be supplied by the docking station to the rheometer via the locating features. In other embodiments, any of the power, data or pressurized air connections may be via a separate connection other than the locating features. For example, in some embodiments, a separate hose may be used to connect the rheometer to the docking station for pressurized air. In some embodiments, a separate power line or a separate data line may be connected between the rheometer and the docking station. In some embodiments, the power and data lines may be combined within a single connector.

In some embodiments, however, the docking station only provides a physical engagement with the rheometer, and no power, data, and/or pressurized air is transferred between the two. In some embodiments, the rheometer may connect to a separate work cell for power, data and/or pressurized air.

In some embodiments, the rheometer docking station may include a user interface, such as the user interface 20 shown in FIGS. 1, 3 and 4. The user interface may allow an operator to interact with the rheometer docking station and/or the rheometer. The user interface may provide information to the operator, e.g., test results, operating status, errors, troubleshooting guidance, maintenance recommendations, etc. Alternatively or in addition, an operator may use the user interface to communicate with the rheometer and/or to the rheometer docking station, e.g., to command the rheometer to run a test, to schedule tests, to provide information about the tested sample, etc. The user interface may be a control panel, a display screen, a computer, or any other suitable user interface. In some embodiments, the user interface may be a touch screen.

Computing Devices

In some embodiments, techniques described herein, such as the calibration process for position mapping of components, may be carried out using one or more computing devices, including, but not limited to, network databases, storage systems, and central plant controllers. For example, the system may include a controller that includes one or more computing devices. Embodiments are not limited to operating with any particular type of computing device.

Figure 10:
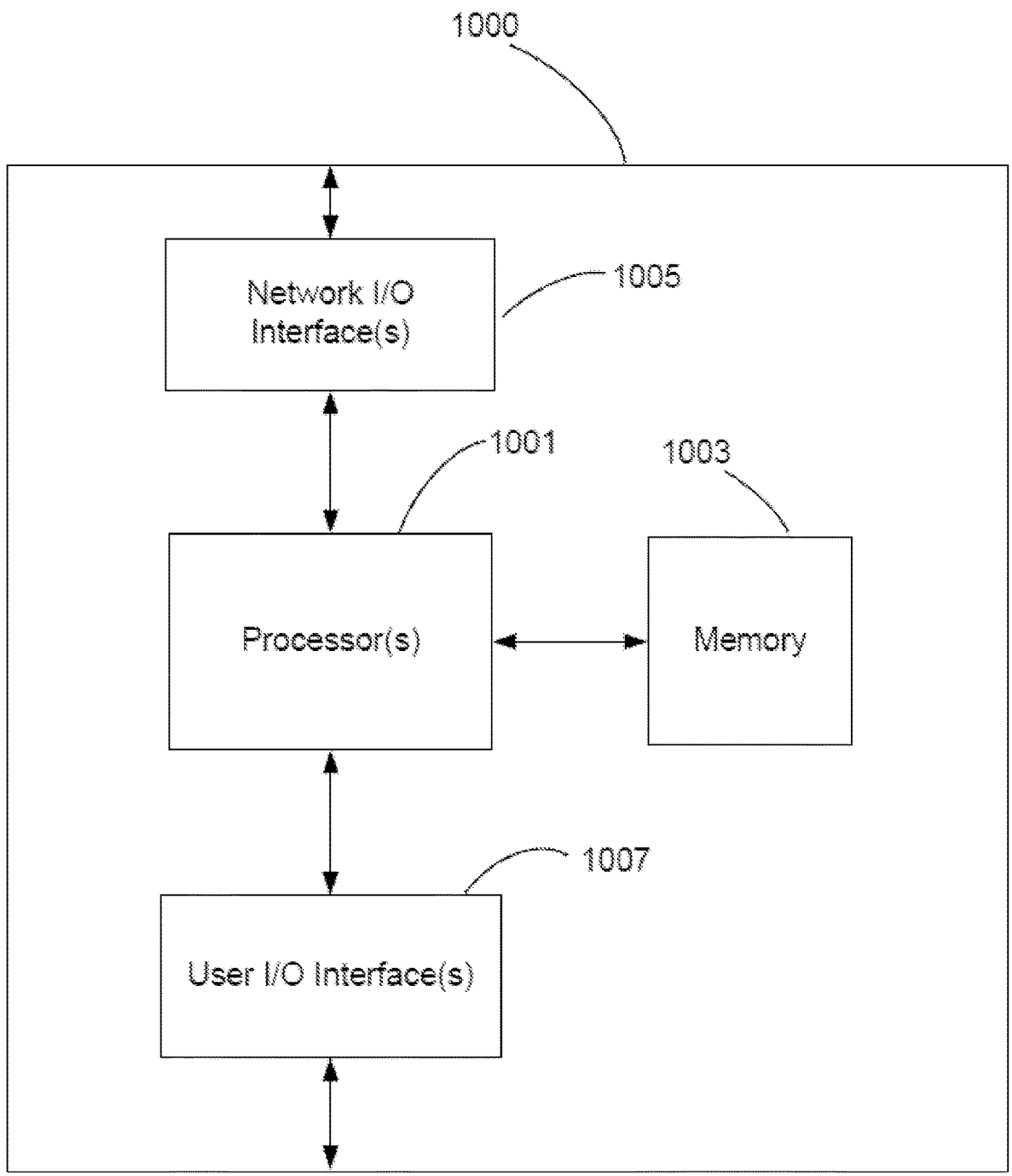
FIG. 10 is a block diagram of an illustrative computing device that may be used to implement a method of docking a rheometer.

FIG. 10 is a block diagram of an illustrative computing device 1000 that may be used to implement any of the above-described techniques. Computing device 1000 may include one or more processors 1001 and one or more tangible, non-transitory computer-readable storage media (e.g., memory 1003). Memory 1003 may store, in a tangible non-transitory computer-recordable medium, computer program instructions that, when executed, implement any of the above-described functionality. Processor(s) 1001 may be coupled to memory 1003 and may execute such computer program instructions to cause the functionality to be realized and performed.

Computing device 1000 may also include a network input/output (I/O) interface 1005 via which the computing device may communicate with other computing devices (e.g., over a network), and may also include one or more user I/O interfaces 1007, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above. In some embodiments, a combination of programmable hardware and dedicated hardware may also be used.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-discussed functions of one or more embodiments. The computer-readable medium may be transportable such that the program stored thereon can be loaded onto any computing device to implement aspects of the techniques discussed herein. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Other features of a conventional rheometer may be used in connection with the rheometer and rheometer docking station discussed herein. Such additional features will be readily apparent to one of skill in the art.

It should be appreciated that the invention is not limited in this regard as one or any combination of these listed purposes may be obtained and that the invention is not limited to a die assembly that achieves all of them. In addition, the invention is not limited to achieving any of these purposes. Instead, as stated, a desired outcome is obtaining more accurate measurements with less instrument recalibration and seal replacement than what was available in the past.

It should be appreciated that the rheometer docking station described here may be formed with one or more of the above-described features. The above aspects and features may be employed in any suitable combination as the present invention is not limited in this respect. It should also be appreciated that the drawings illustrate various components and features which may be incorporated into various embodiments of the invention. For simplification, some of the drawings may illustrate more than one optional feature or component. However, the invention is not limited to the specific embodiments disclosed in the drawings. It should be recognized that some embodiments may include only a portion of the components illustrated in any one drawing figure, and/or may also encompass embodiments combining components illustrated in multiple different drawing figures.

It should be understood that the foregoing description of various embodiments of the invention are intended merely to be illustrative thereof and that other embodiments, modifications, and equivalents of the invention are within the scope of the invention recited in the claims appended hereto.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A rheometer docking station, comprising:
   a base;
   a docking body associated with the base, the docking body configured to receive a rheometer in a docking arrangement;

a guide configured to guide the rheometer into an aligned position with the docking body, the guide including an entry having a funnel-shaped configuration to facilitate alignment of the rheometer with the docking body as the rheometer is received by the docking body; and a first locating component associated with the docking body, the first locating component being configured to mate with a second locating component of the rheometer to locate the rheometer in a docked position.

2. The rheometer docking station of claim 1, wherein the first locating component has a female component and the second locating component comprises a male component.

3. The rheometer docking station of claim 1, wherein the first locating component has an opening and the second locating component comprises a locating pin.

4. The rheometer docking station of claim 1, wherein the first locating component comprises a male component and the second locating component comprises a female component.

5. The rheometer docking station of claim 1, wherein the first locating component comprises a locating pin and the second locating component has an opening.

6. The rheometer docking station of claim 1, wherein the guide is attached to the base.

7. The rheometer docking station of claim 1, wherein the guide is positioned on the base.

8. The rheometer docking station of claim 1, further comprising a hood located on an upper portion of the docking body and configured to receive and shield at least a portion of the rheometer.

9. The rheometer docking station of claim 8, wherein the hood includes a first door that is moveable between an opened position to receive the at least a portion of the rheometer and a closed position to shield the at least a portion of the rheometer.

10. The rheometer docking station of claim 9, wherein the hood includes a second door that is moveable between an opened position to receive the at least a portion of the rheometer and a closed position to shield the at least a portion of the rheometer.

11. The rheometer docking station of claim 9, wherein the first movable door rotates up and down relative to the body.

12. The rheometer docking station of claim 10, wherein the second movable door rotates side to side relative to the body.

13. The rheometer docking station of claim 1, further comprising a power line connected to the docking station and configured to couple with and supply power to the rheometer.

14. The rheometer docking station of claim 1, further comprising a data line configured to couple with the rheometer to permit communication between the rheometer and the rheometer docking station.

15. The rheometer docking station of claim 1, further comprising a pressurized air line connected to the docking station and configured to couple with the rheometer to supply pressurized air to the rheometer.

16. The rheometer docking station of claim 1, furthering comprising lift tubes located adjacent the base and configured to receive forks of a forklift.

17. The rheometer docking station of claim 1, wherein the base is vertically moveable.

18. The rheometer docking station of claim 1, wherein the guide comprises a back surface.

19. The rheometer docking station of claim 1, further comprising a user interface associated with the docking body, wherein the user interface is configured to be used to interact with the rheometer.

20. The rheometer docking station of claim 19, wherein the user interface includes a display.

21. The rheometer docking station of claim 20, wherein the display includes a touchscreen display.

22. The rheometer docking station of claim 1, further comprising a locking mechanism to lock the rheometer docking station to the rheometer.

23. A system, comprising:

a rheometer;

a rheometer docking station comprising a base, a docking station body and a guide for guiding the rheometer into an aligned position with the rheometer docking station, the guide including an entry having a funnel-shaped configuration to facilitate alignment of the rheometer with the docking body as the rheometer is received by the docking body;

wherein the rheometer docking station includes a first locating component; and wherein the rheometer includes a second locating component, the first locating component configured to mate with the second locating component to locate the rheometer in a docked position.

24. The system of claim 23, wherein the first locating component has a female component and the second locating component comprises a male component.

25. The system of claim 23, wherein the first locating component has an opening and the second locating component comprises a locating pin.

26. The system of claim 23, wherein the first locating component comprises a male component and the second locating component comprises a female component.

27. The system of claim 26, wherein the first locating component comprises a locating pin and the second locating component has an opening.

28. The system of claim 25, further comprising a guide plate within which the opening is formed.

29. The system of claim 23, wherein at least a top portion of the rheometer is vertically moveable.

30. The system of claim 23, further comprising a locking mechanism to lock the rheometer docking station to the rheometer.

31. The system of claim 30, wherein the locking mechanism comprises a latch-action toggle clamp.

32. The system of claim 27, wherein the opening comprises a slot having a tapered region having a decreasing width and a narrowed region.

33. A method of locating a rheometer within a rheometer docking station, comprising:

moving a rheometer toward a rheometer docking station;

positioning the rheometer between lateral walls of a guide on the rheometer docking station to align the rheometer with the rheometer docking station; and mating a first locating component associated with the rheometer docking station with a second locating component associated with the rheometer to locate the rheometer in a docked position.

34. The method of claim 33, wherein the first locating component comprises a female component and the second locating component comprises a male component.

35. The rheometer docking station of claim 33, wherein the first locating component has a guide hole and the second locating component comprises a locating pin.

36. The rheometer docking station of claim 33, wherein the first locating component comprises a male component and the second locating component has a female component.

37. The rheometer docking station of claim 33, wherein the first locating component comprises a locating pin and the second locating component has an opening.

38. The method of claim 33, wherein the guide includes a funnel-shaped configuration to facilitate alignment of the rheometer with the docking station as the rheometer is received by the docking station.

39. The method of claim 33, wherein the guide comprising a back surface against which the rheometer bottoms out against when the rheometer is moved into the docked position.

40. The method of claim 33, further comprising moving the rheometer onto a base of the rheometer docking station.

41. The method of claim 35, further comprising moving at least a top portion of the rheometer vertically upward until the locating pin is received within the guide hole.

42. The method of claim 35, wherein the locating pin is connected to the rheometer and the guide hole is connected to the rheometer docking station.

43. The method of claim 35, wherein the locating pin is connected to the rheometer docking station and the guide hole is connected to the rheometer.

44. The method of claim 33, wherein the rheometer is located within the rheometer docking station in three dimensions.

45. The method of claim 33, further comprising locking the rheometer to the rheometer docking station via a locking mechanism.

46. The method of claim 37, wherein the opening comprises a slot having a tapered region having a decreasing width and a narrowed region.

* * * * *